United States Patent
Srinivasaraghavan

(10) Patent No.: US 10,114,824 B2
(45) Date of Patent: Oct. 30, 2018

(54) TECHNIQUES FOR PROVIDING A USER WITH CONTENT RECOMMENDATIONS

(71) Applicant: Verizon Patent and Licensing Inc., Arlington, VA (US)

(72) Inventor: Haripriya Srinivasaraghavan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 237 days.

(21) Appl. No.: 14/799,206

(22) Filed: Jul. 14, 2015

(65) Prior Publication Data
US 2017/0017649 A1  Jan. 19, 2017

(51) Int. Cl.
G06F 17/30 (2006.01)
G06N 7/00 (2006.01)
G06N 3/04 (2006.01)
G06Q 30/00 (2012.01)

(52) U.S. Cl.
CPC ..... *G06F 17/30029* (2013.01); *G06N 3/0472* (2013.01); *G06N 7/005* (2013.01); *G06Q 30/00* (2013.01)

(58) Field of Classification Search
CPC ..................................................... G06F 17/30
See application file for complete search history.

(56) References Cited

U.S. PATENT DOCUMENTS

| | | | | |
|---|---|---|---|---|
| 2002/0161664 A1* | 10/2002 | Shaya | ........... | G06Q 30/02 705/26.1 |
| 2014/0122502 A1* | 5/2014 | Kalmes | ........... | G06F 17/30029 707/748 |
| 2015/0220525 A1* | 8/2015 | Ross | ........... | G06F 17/30 707/737 |
| 2015/0278350 A1* | 10/2015 | Nice | ........... | G06F 17/30699 707/754 |
| 2017/0124628 A1* | 5/2017 | Kirkby | ........... | G06Q 30/0631 |

* cited by examiner

*Primary Examiner* — Khanh B Pham

(57) ABSTRACT

Techniques described herein may be used to improve recommendations that are provided to a user regarding content (e.g., images, music, and videos). A content recommendations server may provide a user with recommended content and the reasons for which the content is being recommended, such as genres, directors, and actors that the content recommendations server believes the user enjoys. The user may provide feedback to the content recommendations server regarding the recommendations themselves and also regarding the reasons for which the content was recommended. The content recommendations server may use the feedback to improve subsequent recommendations to the user.

20 Claims, 11 Drawing Sheets

400A →

| Feature | Spielberg | Pacino | Action | Comedy | 1970s | English | Spanish |
|---|---|---|---|---|---|---|---|
| John | 5 | 6 | 1 | 2 | 3 | 5 | 0 |
| Jane | 2 | 1 | 2 | 4 | 1 | 2 | 3 |
| ... | ... | ... | ... | ... | ... | ... | ... |

| Feature | Spielberg | Pacino | Action | Comedy | 1970s | English | Spanish |
|---|---|---|---|---|---|---|---|
| John | 5x0.8=4 | -- | 1 | 2 | 3 | 5 | 0 |
| Jane | 2 | 1 | 2 | 4 | 1 | 2 | 3 |
| ... | ... | ... | ... | ... | ... | ... | ... |

Fig. 4B

| Feature | Language | Director | ... |
|---|---|---|---|
| James | 3 | 1 | ... |
| Angela | 2 | 1 | ... |
| ... | ... | ... | ... |

| Feature | Language | Director | ... |
|---|---|---|---|
| James | 3x0.5=1.5 | 1x3=3 | ... |
| Angela | 2 | 1 | ... |
| ... | ... | ... | ... |

700A

| Feature | English | Spanish | ... |
|---|---|---|---|
| James | 2 | 3 | ... |
| Angela | 2 | 1 | ... |
| ... | ... | ... | ... |

| Feature | English | Spanish | ... |
|---|---|---|---|
| James | 2x1.5=3 | 3x0.5=1.5 | ... |
| Angela | 2 | 1 | ... |
| ... | ... | ... | ... |

Fig. 7B

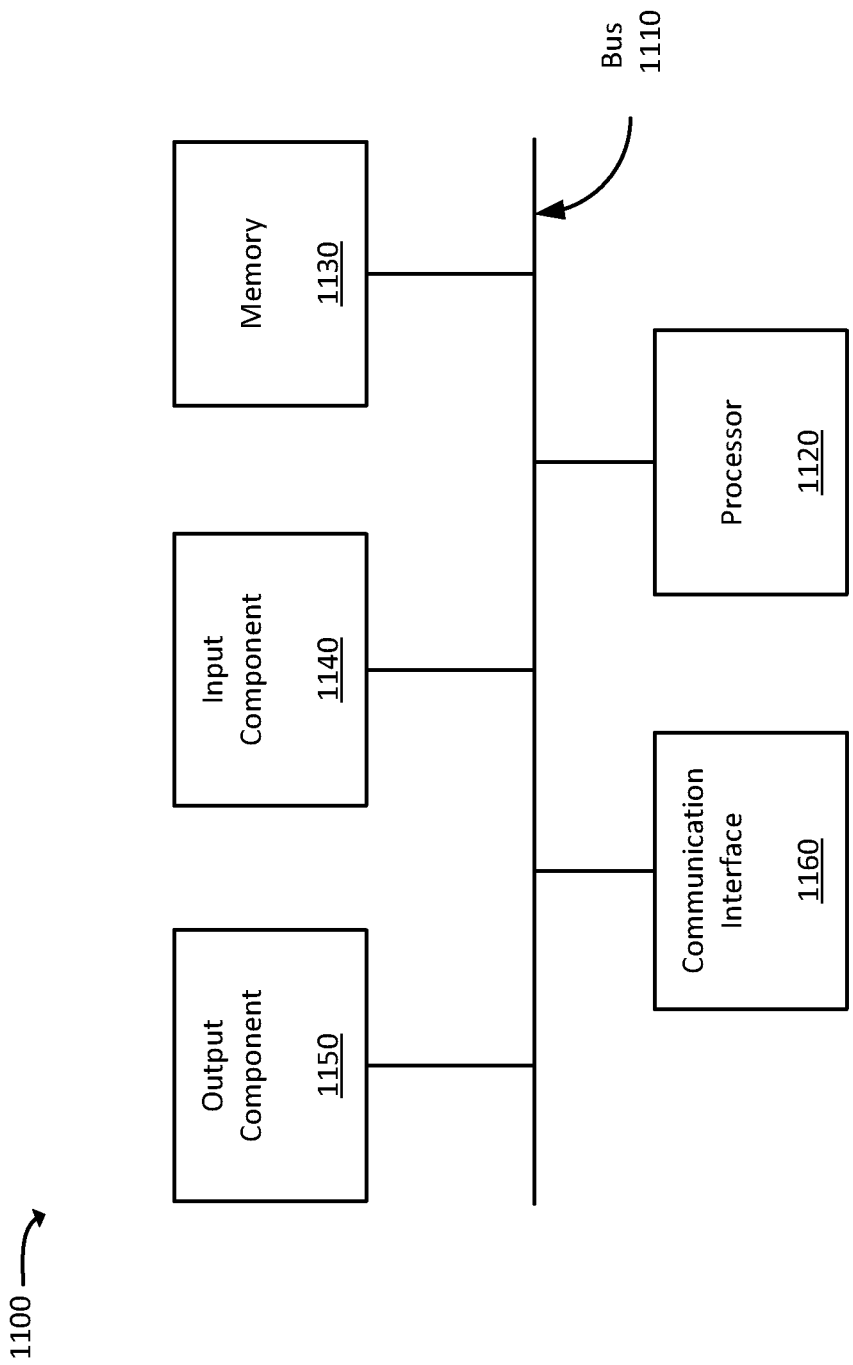

TECHNIQUES FOR PROVIDING A USER WITH CONTENT RECOMMENDATIONS

BACKGROUND

Current network technologies provide users with access to a variety of media content (e.g., images, music, and videos). Some technologies are capable of providing content recommendations to users based on, for example, what movies a user has watched and whether the user enjoyed the movie. For instance, some technologies will provide a user interface that states, "Because you watched movie 'A,' you may enjoy watching movie 'B.'"

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIGS. 4A and 4B are diagrams of examples of single-tiered utility matrices for determining content recommendations for a user;

FIGS. 7A and 7B are diagrams of examples of feature matrices for determining content recommendations for a user;

FIG. 11 is a diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to improve content (e.g., images, music, and videos) recommendations that are provided to a user by enabling the user to provide feedback regarding the reasons for which the content is being recommended (as opposed to, for example, merely enabling the user to provide feedback regarding the recommended content itself). A content recommendations server may provide a user with recommended content and the reasons for which the content is being recommended, such as genres, directors, and actors that the content recommendations server believes that the user enjoys. The user may provide feedback to the content recommendations server regarding the recommendations themselves and also feedback regarding the reasons for which the content was recommended. The content recommendations server may use the feedback to improve subsequent recommendations to the user. As such, systems and methods described herein may be used to improve content recommendations based on user feedback regarding the reasons for which content is recommended (in addition to feedback regarding the content itself).

Figure 1:
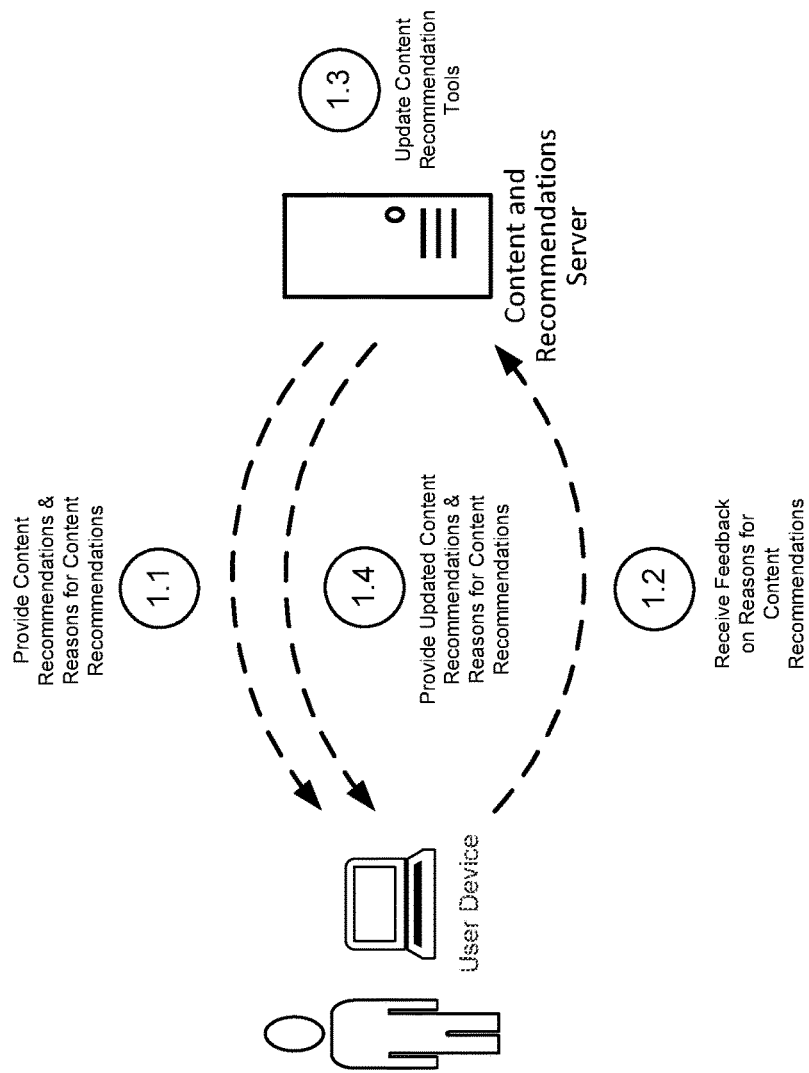
FIG. 1 illustrates an example overview of an implementation described herein.

FIG. 1 illustrates an example overview of an implementation described herein. As shown in FIG. 1, a content recommendations server may determine content (e.g., movies, televisions programs, etc.) that is recommended for a user (e.g., content that the user would likely enjoy) (at 1.1). The recommendations may be based on a viewing history, profile information, and feedback previously received from the user. The content recommendations server may provide the content recommendations and the reasons for the content recommendations to a user device (at 1.2). For instance, in addition to recommending that a user view a particular action film, the content and recommendations server may inform the user that the action film is being recommended because the user appears to enjoy other action movies, movies by the same director as the recommended action move, other movies that involve the same or similar cast, etc.

The content recommendations server may enable the user to provide feedback regarding the reasons for which the particular movie is being recommended (at 1.3). For instance, the user may inform the content recommendations server that the user does not enjoy (or no longer enjoys) movies from the particular director, movies involving a particular actor, etc. The content recommendations server may update user profile information for the user based on the feedback (at 1.4) and provide updated content recommendations to the user based on the newly updated user profile information (at 1.5). In this manner, the content recommendations server may suggest superior content recommendations by providing the user with the reasons for which content is recommended, enabling the user to provide feedback regarding the reasons for which the content is recommended, and modifying subsequent recommendations based on the feedback from the user.

Figure 2:
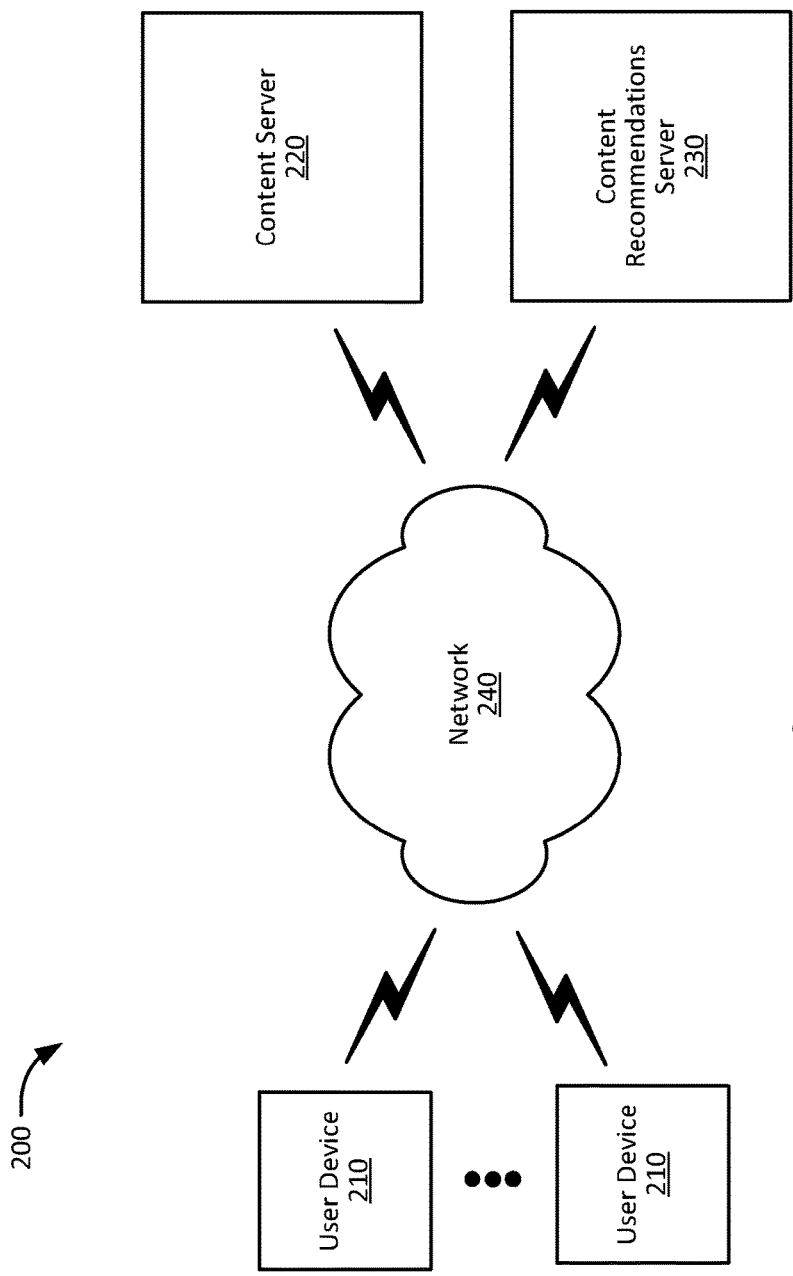
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, content server 220, content recommendations server 230, and network 240. As shown, content server 220 and content recommendations server 230 may be implemented by different devices; however, in other implementations, content server 220 and content recommendations server 230 may be implemented by the same device.

User device 210 may include a portable computing and communication device, such as a personal digital assistant (PDA), a smart phone, a cellular phone, a laptop computer with connectivity to a cellular wireless network, a tablet computer, etc. User device 210 may also include a non-portable computing device, such as a desktop computer, a consumer or business appliance, or another device that has the ability to connect to network 240. In some implementations, user device 210 may include a set top box, a video game console, or a similar device, capable of communicating with content server 220 and content recommendations server 230 via network 240.

Content server 220 may include one or more computing devices, such as a server device or a collection of server devices associated with a content provider that may provide content to user devices 210. In some implementations, content server 260 may be a web server that hosts webpages and/or content (e.g., images, videos, audio, etc.). Additionally, or alternatively, a link to content stored by content server 220 may be presented within an application or webpage associated with a web server or application server.

Content recommendations server 230 may include one or more computing devices, such as a server device or a collection of server devices capable of performing one or more of the operations described herein. For instance, content recommendations server 230 may determine content that is recommended for a user based on user profile information of the user and provide the recommendations, and the reasons for the recommendations, to user device 210. Content recommendations server 230 may also receive feedback from the user regarding the content itself and the reasons for which the content was recommended. Content recommendations server 230 may update user profile information for the user based on the feedback and provide updated content recommendations in response to receiving the feedback from the user. In some implementations, content recommendations server 230 may send and receive information from the user via a browser or other application installed on user device 210.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution ("LTE") network, a global system for mobile ("GSM") network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
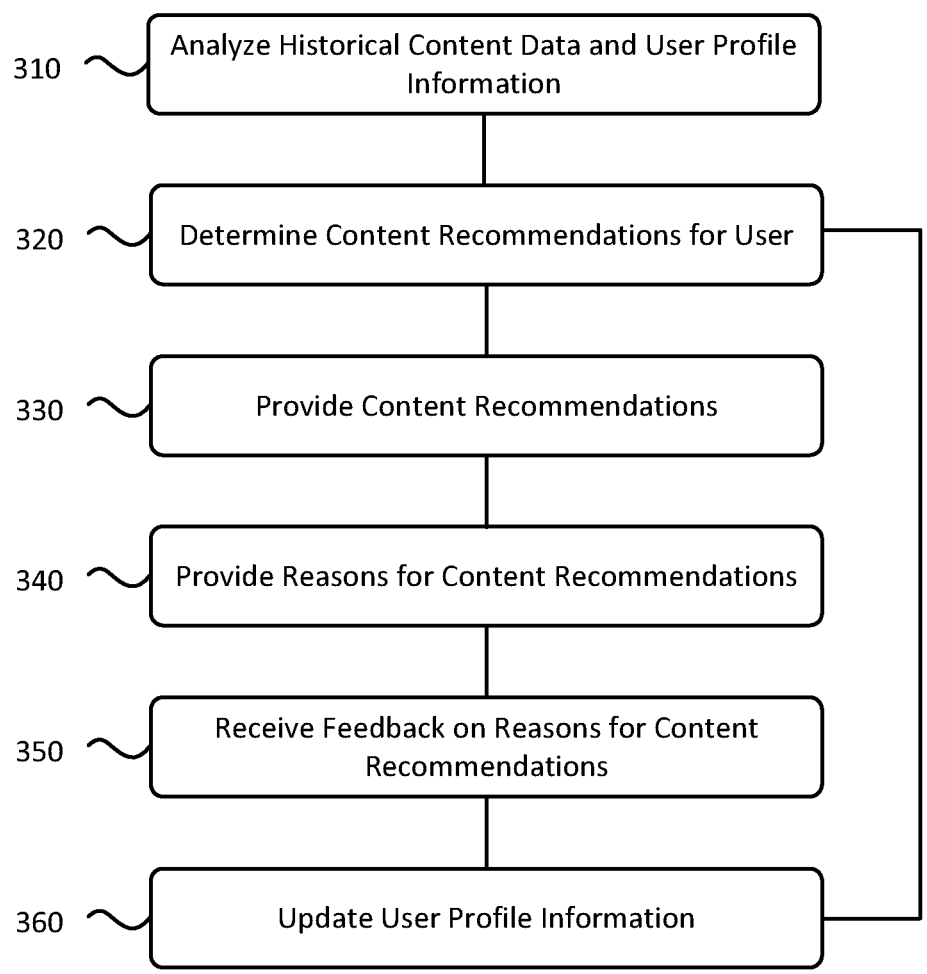
FIG. 3 is a flowchart diagram of an example process for providing content recommendations to a user.

FIG. 3 is a flowchart diagram of an example process 300 for providing content recommendations to a user. Process 300 may be implemented by content recommendations server 230.

As shown, process 300 may include analyzing content data and user profile information (block 310). For example, content recommendations server 230 may analyze user profile information associated with a particular user. The user profile information may include content data that the user has viewed in the past, the number of times that the user has viewed the content, a duration for which the user has viewed the content (e.g., whether the user viewed an entire movie or not), and ratings information (e.g., a "like" or "dislike," 1 star, 2 stars, 3 stars, etc.) provided by the user regarding content. User profile information may also include information describing the user, such as an age of the user, a race of the user, a gender of the user, a primary geographical location of the user, etc. Content recommendations server 230 may also analyze user profile information to characterize viewing habits of the user (e.g., whether the user is an avid or casual movie watcher, what genres of media the user appears to prefer, whether the user appears to enjoy watching movies or television series, etc.).

Process 300 may include determining content recommendations for the user (block 320). For instance, content recommendations server 230 may identify content that the user would likely enjoy based on an analysis of the user profile information of the user. In some implementations, content recommendations server 230 may determine the content recommendations by matching the user profile information of the user (e.g., content that the user has viewed in the past, ratings information received from the user, demographics information of the user, etc.) with content that the user has not viewed yet.

In some implementations, content recommendations server 230 may identify other users that appear to have similar interests, viewing habits, and/or that correspond to a similar demographic as the user. Identifying other users that are similar to the user in question may enable content recommendations server 230 to make recommendations based on the types of movies that the other users have enjoyed. To do so, in some implementations, content recommendations server 230 may create a multi-user profile that includes generic profile information representative of a group of similar users or that includes a logical grouping of individual profiles of similar users. The users may be similar in one or more ways, such as demographic information, viewing history information, geographic information, etc. Content recommendations may also be made based on the current popularity of a movie. In some implementations, content recommendations server 230 may implement one or more tools for determining the types of content that the user would likely enjoy. For example, as described in detail below with reference to FIGS. 4-7, such tools may include a single-tiered utility matrix, a multi-tiered utility matrix, a neural network, or a Hidden Markov Model (HMM).

Process 300 may include providing content recommendations (block 330). For example, content recommendations server 230 may communicate, to user device 210, content that the user is likely to enjoy. The content recommendations may be based on user profile information that is stored for the user by content recommendations server 230. For instance, if content recommendations server 230 determines that the user would likely enjoy the movie The Lion King, the Lion King may be presented to the user via a user interface on user device 210.

Process 300 may include providing reasons for the content recommendations (block 340). For example, content recommendations server 230 may communicate, to user device 210, the reason for which the content recommendations (see block 330) were provided to the user. For instance, if the Lion King were recommended to the user, content recommendations server 230 may indicate that the Lion King was recommended because the user appears to enjoy: 1) movies; 2) animated content; 3) themes regarding loyalty and responsibility; 4) comedies; 5) dramas; 6) musicals; and 7) James Earl Jones (the actor). Examples of reasons for which content recommendations are provided are discussed below with respect to FIGS. 4A-9, and especially with respect to FIG. 10.

Process 300 may include receiving feedback regarding the reasons for the content recommendations (block 350). For example, content recommendations server 230 may receive information from the user about whether the user is interested in the recommended content and/or whether the user agrees of the reasons for which the content was recommended. For instance, if content recommendations server 230 recommended The Lion King because the user appears to enjoy: 1) movies; 2) animated content; 3) themes regarding loyalty and responsibility; 4) comedies; 5) dramas; and 6) James Earl Jones, the user may indicate that while the user would like to view The Lion King, the user does not particularly enjoy musicals or content involving James Earl Jones. Additionally, the user may indicate that the user especially enjoys animated content and comedies. The feedback may be in one or more forms, such as a simple confirmation (e.g., a "yes" or "no," a "like" or "dislike," etc.), in accordance with a rating system (e.g., a number of stars), a weighted scale (e.g., a number between 1 and 10 regarding how significant each factor is to the user), words and phrases that are typed by the user, etc. As such, content recommendations server 230 may receive feedback from the user regarding content recommendations and the reasons for which the content was recommended.

Process 300 may include updating the user profile information for the user (block 360). For example, content recommendations server 230 may update user profile information, of the user, based on the feedback received from the user. For instance, if the user indicates that the user does not enjoy musicals or content involving James Earl Jones, content recommendations server 230 may update a user profile of the user to reflect the user's feedback. Content recommendations server 230 may also update the user profile based on feedback regarding the content recommendation itself. Additionally, as shown in FIG. 3, process 300 may return to, for example, determining content recommendations for the user (block 320). As such, process 300 may be implemented to improve recommendations that are provided to the user regarding content by enabling the user to provide feedback regarding the reasons for which the content is being recommended.

FIGS. 4A and 4B are diagrams of examples of single-tiered utility matrices 400A and 400B for determining content recommendations for a user. As shown, single-tiered utility matrix 400A may correspond to a pre-feedback matrix (i.e., a single-tiered utility matrix before feedback from the user has been received) and single-tiered utility matrix 400B may correspond to a post-feedback matrix (i.e., the single-tiered utility matrix after feedback from the user has been applied). Single-tiered utility matrices 400A and 400B may be examples of user profile information corresponding to corresponding to the example users "John" and "Jane".

Single-tiered utility matrices 400A and 400B may include a row of features (e.g., Spielberg, Pacino, Action, etc.) associated with a column of users (e.g., John, Jane, etc.). Single-tiered utility matrix 400A may have a numeric value associated with each feature to indicate a number of times the user has viewed or listened to (and/or "liked") content associated with the corresponding feature. For instance, single-tiered utility matrix 400A may indicate that John has viewed content associated with Spielberg (i.e., the director Steven Spielberg) on 5 occasions, has viewed content associated with Pacino (i.e., the actor Al Pacino) on 6 occasions, and so on.

In some implementations, content recommendations server 230 may use single-tiered utility matrix 400A to determine content recommendations for John or Jane. For instance, content recommendations server 230 may analyze the information corresponding to John and determine that John enjoys movies that are in English and that involve Steven Spielberg and/or Al Pacino based on the number of times that John has viewed content corresponding to Spielberg, Pacino, and English. Content recommendations server 230 may also determine that John does not tend to view movies that are in Spanish. As such, content recommendations server 230 may match the user profile information of John to available content (e.g., movies) in order to identify one or more content recommendations for John.

Additionally, content recommendations server 230 may indicate that the content recommendations for John are based on the number of times that John has watched movies that are in English and that involve Steven Spielberg and/or Al Pacino. Content recommendations server 230 may also provide John with an opportunity to provide feedback regarding the content recommendations and the reasons for the content recommendations. In response to receiving the feedback, content recommendations server 230 may update the user profile information for John in one or more ways, such as by eliminating a feature from single-tiered utility matrix 400 (e.g., if John does not (or no longer) enjoys movies associated with Spielberg), by introducing (or modifying) a weighted factor to increase or decrease the importance of a particular feature, etc.

For instance, if John indicates that he is no long interested in movies starring Al Pacino and that his interest in Spielberg is waning, content recommendations server 230 may eliminate the feature corresponding to Pacino (represented in FIG. 4B by the notation "-") and modify the significance of Spielberg based on a factor that is, for example, indicated by the user. In the example of FIG. 4B, the factor is "0.8," which reduces the significance of Spielberg from a "5" to a "4" as it relates to determining content recommendations for John. As such, subsequent content recommendations for John may be different since the significance of Spielberg has been reduced and the significance of Pacino has been eliminated. In some implementations, the feedback may include instructions for adding a new feature (e.g., Romance) to single-tiered utility matrix 400B, along with an indication of how much the user is interested in content associated with the newly introduced feature.

Figure 5:
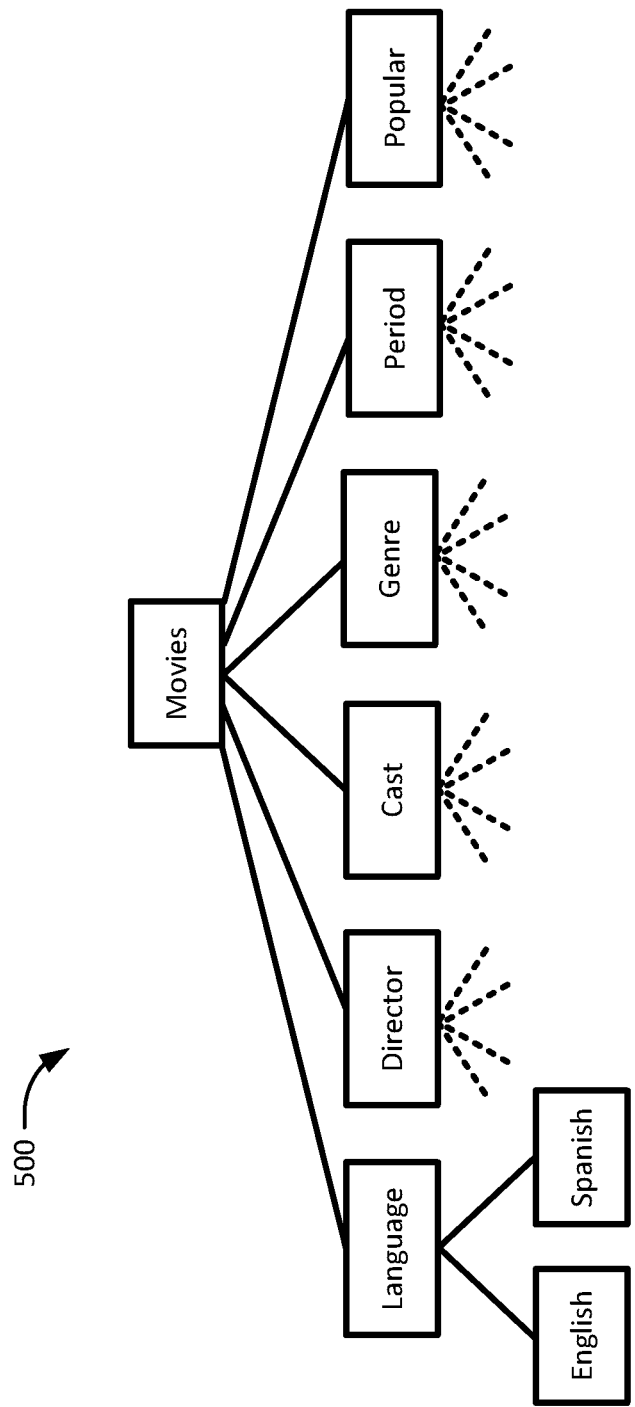
FIG. 5 is a diagram of an example of a multi-tiered utility matrix for determining content recommendations for a user.

FIG. 5 is a diagram of an example of a multi-tiered utility matrix 500 for determining content recommendations for a user. As shown, multi-tiered utility matrix 500 may include a content category (e.g., Movies) that is logically associated with a tier of feature categories (e.g., Language, Director, etc.), and in turn, each feature category may be logically associated with specific features (e.g., English, Spanish, etc.). In some implementations, multi-tiered utility matrix 500 may include sub-feature categories between the tier of feature categories and the specific features within the feature categories. As described below with reference to FIGS. 6A-7B, implementing a multi-tiered utility matrix may enable content recommendations server 230 to implement user feedback regarding feature categories (e.g., Language, Director, etc.) in addition to specific features (e.g., English, Spanish, etc.).

Figure 6A:
FIGS. 6A and 6B are diagrams of examples of feature category matrices for determining content recommendations for a user.
Figure 6B:

FIGS. 6A and 6B are diagrams of examples of feature category matrices 600A and 600B for determining content recommendations for a user. Feature category matrices 600A and 600B may correspond to the feature categories (e.g., Language, Director, etc.) discussed above with reference to FIG. 5. Feature category matrix 600A may correspond to a pre-feedback matrix (i.e., a matrix before feedback from the user has been received) and feature category matrix 600B may correspond to a post-feedback matrix (i.e., the matrix after feedback from the user has been applied). Additionally, feature category matrices 600A and 600B may include a row of feature categories (e.g., Language, Director, etc.) associated with a column of users (e.g., James, Angela, etc.). Feature category matrices 600A and 600B may be examples of user profile information corresponding to James and Angela.

Feature category matrix 600A may have a numeric value associated with each feature category to indicate a level of significance that the feature category has been assigned. The numeric value may be assigned by the user manually and/or deduced by content recommendations server 230 based on, for example, historical viewing data of the user. In the example of FIG. 6A, the feature category of Language for James has been assigned a numeric value of 3, while the feature category of Director has been assigned a value of 1.

In some implementations, this may indicate that the language of a movie is more (e.g., three times more) significant to James than the director of the movie. As such, content recommendations server 230 may determine content recommendations based on the relative values of the feature categories of Language and Director (i.e., content recommendations server 230 may place greater weight on the language of a movie than the director of the movie when recommending movies to James). Additionally, content recommendations server 230 may communicate to James that the recommendations provided by content recommendations server 230 were provided because of the relative significance of the feature categories of Language and Director.

Additionally, content recommendations server 230 may receive feedback from James indicating that adjustments should be made regarding the relative significance of the language of a movie and the director of the movie. For instance, as shown in FIG. 6B, James may indicate to content recommendations server 230 that the significance, with respect to content recommendations, of the feature category of Language should be reduced (e.g., by a factor of 0.5) and that the significance of the feature category of Director should be increased by a factor of 3). This may inform content recommendations server 230 that the director of a movie is actually more important (e.g., twice as important) to James when selecting a movie than the language of the movie. As such, implementing a multi-tiered utility matrix may enable content recommendations server 230 to implement user feedback regarding feature categories.

FIGS. 7A and 7B are diagrams of examples of feature matrices 700A and 700B for determining content recommendations for a user. Feature matrices 700A and 700B may correspond to the feature category of Language as discussed above with reference to FIG. 5. As shown, feature matrix 700A may correspond to a pre-feedback matrix (i.e., a feature matrix before feedback from the user has been received) and feature matrix 700B may correspond to a post-feedback matrix (i.e., the feature matrix after feedback from the user has been applied). Additionally, feature matrices 700A and 700B may be represented a row of features (e.g., English, Spanish, etc.) associated with a column of users (e.g., James, Angela, etc.). Feature matrices 700A and 700B may be examples of user profile information corresponding to James and Angela.

Feature matrix 700A may have a numeric value associated with each feature to indicate a number of times the user has viewed or listened to (and/or "liked") content associated with the corresponding feature. For instance, feature matrix 700A may indicate that James has viewed content in English on 2 different occasions, has viewed content in Spanish on 3 different occasions, and so on. In some implementations, content recommendations server 230 may use feature matrix 700A to determine content recommendations for James or Angela. For instance, content recommendations server 230 may analyze the information corresponding to James and determine that James enjoys movies that are in Spanish a bit more than movies that are in English. As such, content recommendations server 230 may match the user profile information of James to available content in order to identify one or more content recommendations for James.

Additionally, content recommendations server 230 may indicate that the content recommendations for James are primarily based on the number of times that James has watched content that is in English versus Spanish. Content recommendations server 230 may also provide James with an opportunity to provide feedback regarding the content recommendations and the reasons for the content recommendations. In response to receiving the feedback, content recommendations server 230 may update the user profile information for James in one or more ways, such as by eliminating a feature from feature matrix 700B, introducing (or modifying) a weighted factor to increase or decrease the importance of a particular feature, etc.

For instance, if James indicates that his interest in English films is more significant than what was represented, content recommendations server 230 may modify the significance of English movies based on a factor that is, for example, indicated by James. In the example of FIG. 7B, the factor is "1.5," which increases the significance of the moving being in English from a "2" to a "3" as it relates to determining content recommendations for James. Similarly, James may indicate a decrease interest in movies that are in Spanish and may cause a factor of "0.5" to be applied to movies that are in Spanish, thereby reducing the significance that a movie is in Spanish from "3" to "1.5." As such, subsequent content recommendations for John may be much different since the significance of English has increased and the significance of Spanish has been decreased. In some implementations, the feedback may include instructions for adding (and/or eliminating) features to feature matrix 700B along with an indication of how much the user is interested in content associated with the newly introduced feature.

Figure 8:
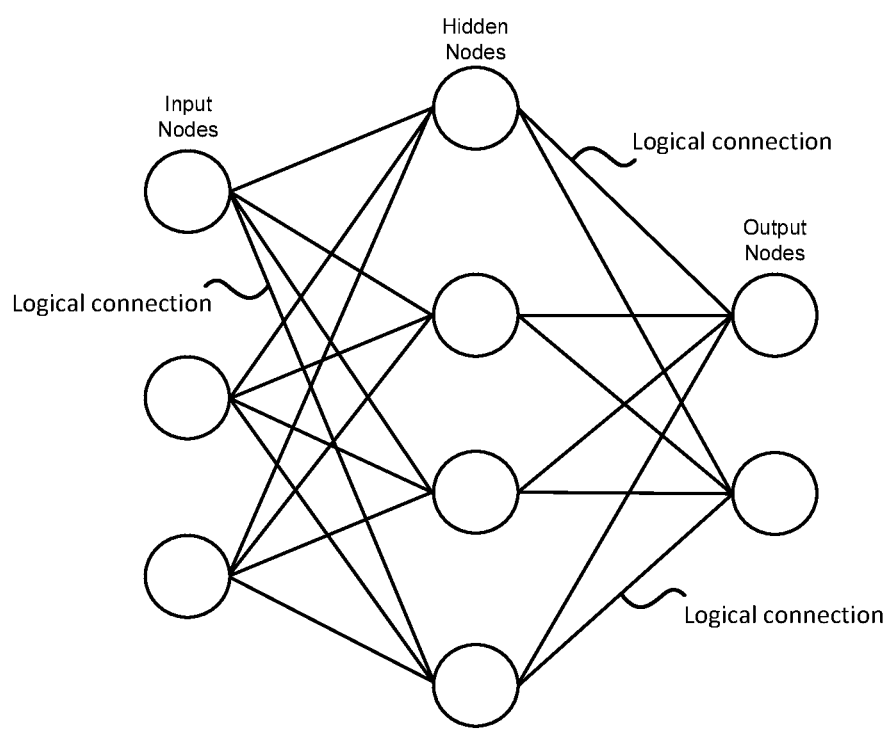
FIG. 8 is a diagram of an example of a neural network for determining content recommendations for a user.

FIG. 8 is a diagram of an example of a neural network 800 for determining content recommendations for a user. Neural network 800 may be a feed-forward or recurrent neural network. As shown, neural network 800 may include input nodes, hidden nodes, and output nodes. Each input vector to the input nodes may include values representing features of a particular content item (e.g., a movie). The features may include, for example, whether the content item is in English, whether the content item is in Spanish, whether the content item is directed by the director "Spielberg", whether the actor "Pacino" stars in the content item, one or more features values representing the genre of the content item, the box office gross of a content item, etc.). The value of an output node may be based on the value of a combination of hidden nodes that can be used to identify content that the user would be likely to enjoy. Neural network 800 may be implemented by recommendations server 230.

As shown, each input node may be logically connected to multiple hidden nodes, such that each hidden node is connected to a number of input nodes. Each connection between an input node and a hidden node may be assigned a weight that modifies the input node with respect to a particular hidden node. That is, each weight may represent an impact that the particular input node has on a particular hidden node. As such, while one hidden node may be connected to a number of input nodes that are the same (or similar) to the input nodes connected to another hidden node, the weighted inputs for each hidden node may be different. In a similar manner, the output of the hidden nodes may be input to the output nodes. For instance, the output of each hidden node may be provided to multiple output nodes, and each input to the output nodes may be modified by a weight.

In some implementations, content recommendations server 230 may generate user profile information based on the weights of a trained version of neural network 800. The training may be based on, for example, a user's rankings of a number of movies. For example, the weights associated with the hidden layer of neural network 800 may represent the complex set of features that are learned during the training of the neural network. For example, the weights of the hidden layer may be analyzed, and the hidden layer nodes that are most influential on the output layer nodes can be interpreted as corresponding to a complex auto-learned feature that is relevant to the user. In this manner, an explicit user profile may be generated from the hidden nodes of neural network 800 and based only on high-level user rankings of movies.

As an example of explicit generation of a user profile based on analysis of the weights of the hidden layer of neural network 800, if a hidden node that has significant weight associated with an output node has a maximum weighted input from the Action genre and the Comedy genre, the profile information for the user may be updated to indicate that the user likely enjoys movies that correspond to movies associated with the genre of Action/Comedies. Similarly, if a hidden node that has significant weight associated with an output node has a maximum weighted input from an input node corresponding to the actor John Travolta and another input node corresponding to movies form the 1980s, the profile information for the user may be updated to indicate that the user likely enjoys movies that correspond to movies starring John Travolta from the 1980s. As such, the hidden layer may indicate complex auto-learned features and synthetic names (e.g., combinations of weighted features) that can be constructed based on the input layers that have maximal effect on the hidden layer. For purposes of establishing a maximum weighted input, content recommendations server 230 may use a normalized threshold or n-highest ranking weight.

Content recommendations server 230 may use the profile derived from neural network 800 to identify additional content recommendations. In addition to providing content recommendation to the user, content recommendations server 230 may also provide to the user with the reasons for the content recommendations (i.e., content recommendations server 230 may provide the user with all or a portion of the explicitly generated user profile). The reasons for the content recommendations may be based on the newly updated profile information. The user may provide feedback to content recommendations server 230 regarding the recommended content and/or the reasons (e.g., the user profile) for which the content was recommended. As a result, content recommendations server 230 may update the profile information for the user, which may in turn result in content recommendations server 230 updating the hidden nodes of neural network 800 and the content recommendations generated using neural network 800.

As mentioned above, content recommendations server 230 may use the update profile information (e.g., the auto-learned features, synthetic names, etc.) to provide the user with content recommendations and the reasons for which the content is being recommended. Content recommendations server 230 may also enable the user profile feedback regarding the content recommendations and reasons for the content recommendations. Content recommendations server 230 may use the feedback to determine whether the content recommendations were accurate and to update profile information for the user, in order to provide better content recommendations to the user. For instance, if the user indicates that he or she is no longer interested in Science Fiction movies from the 1980s, content recommendations server 230 may make appropriate updates to one or more hidden nodes to reflect the updated profile information and produce superior content recommendations. As such, recommendations server 230 may dynamically modify and customize neural network 800 based on feedback from the user in order to enhance the quality of content recommendations provided to the user.

Figure 9:
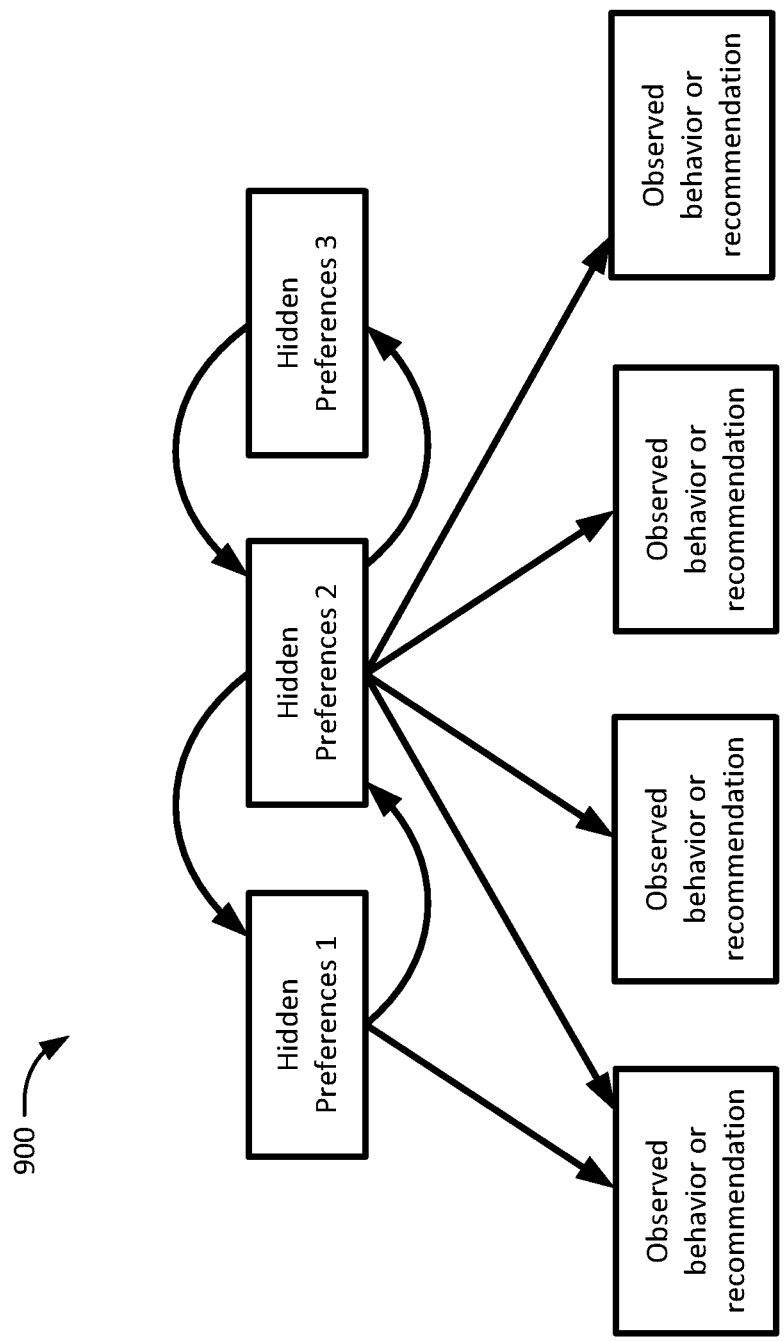
FIG. 9 is a diagram of an example of a model generator for determining content recommendations for a user using a Hidden Markov Model.

FIG. 9 is a diagram of an example of a model generator 900 for determining content recommendations for a user using a HMM. Content recommendations server 230 may implement model generator 900 to determine the current preferences of a user and to predict future preferences of the user. The preferences of a user may be used to create (or modify) a user profile for the user, which may be used by content recommendations server 230 to provide content recommendations to user device 210.

As shown, model generator 900 may include states that represent observed behaviors, hidden preferences, and recommendations and the probability of transitions between the hidden preference states, as well as the probabilities of liking a particular set of recommendations given a set of hidden preferences. Observed behaviors may include behaviors of the user, such as the user watching movies with a particular theme, genre, actor, director, the user liking or disliking a movie, etc. Hidden preferences may include preferences of the user (e.g., preferred themes, genres, actors, etc.) that are discovered, by content recommendations server 230, based on the observed behaviors of the user. The hidden preferences (e.g., hidden preferences 1) may be used to provide content recommendations to the user, which in turn may result in more observed behaviors on the part of the user (e.g., whether the user watches the recommended content or not). The newly observed behaviors, along with the previously determined preferences (e.g., hidden preferences 1), may be used to determine subsequent preferences of the user (e.g., hidden preferences 2), which may lead to additional recommendations, observed behaviors, and hidden preferences (e.g., hidden preferences 3).

Based on observed behaviors of the user, content recommendations server 230 may determine the current hidden preferences (e.g., hidden preferences 1) using an Expectation Maximization algorithm, such as the Baum-Welch algorithm. Additionally, content recommendation server 230 may determine the most likely sequence of hidden preferences (e.g., hidden preferences 2, hidden preferences 3, etc.) using the Viterbi algorithm. As stated above, determining the current preferences of the user, and predicting the future preferences of the user, may be used to generate a user profile and in turn determine effective content recommendations for the user.

Content recommendations server 230 may also provide user device 210 with the reasons for which content has been recommended. In some implementations, this may include the hidden preferences of the user as determined by content recommendations server 230. Content recommendations server 230 may enable the user to provide feedback regarding the content recommendations and the reasons for the content recommendations. In some implementations, the feedback from the user may be used to update a user profile (e.g., the current hidden preferences) of the user.

For instance, content recommendations server 230 may recommend that the user watch the movie Terminator 2 and indicate to the user that Terminator 2 is being recommended because the user appears to enjoy Action movies from the 1990s starring Arnold Schwarzenegger. In response, the user may provide feedback to content recommendations server 230 regarding the prospect of watching Terminator 2 and/or whether the user does in fact enjoy Action movies from the 1990s starring Arnold Schwarzenegger. If the user indicates that he or she is no longer interested in Action movies from the 1990s, content recommendations server 230 may use the feedback to modify the probabilities, eliminate, or create one or more hidden preferences of model generator 900. In some implementations, content recommendations server 230 may provide the user with new content recommendations in response to changing or updating model generator 900.

Figure 10:
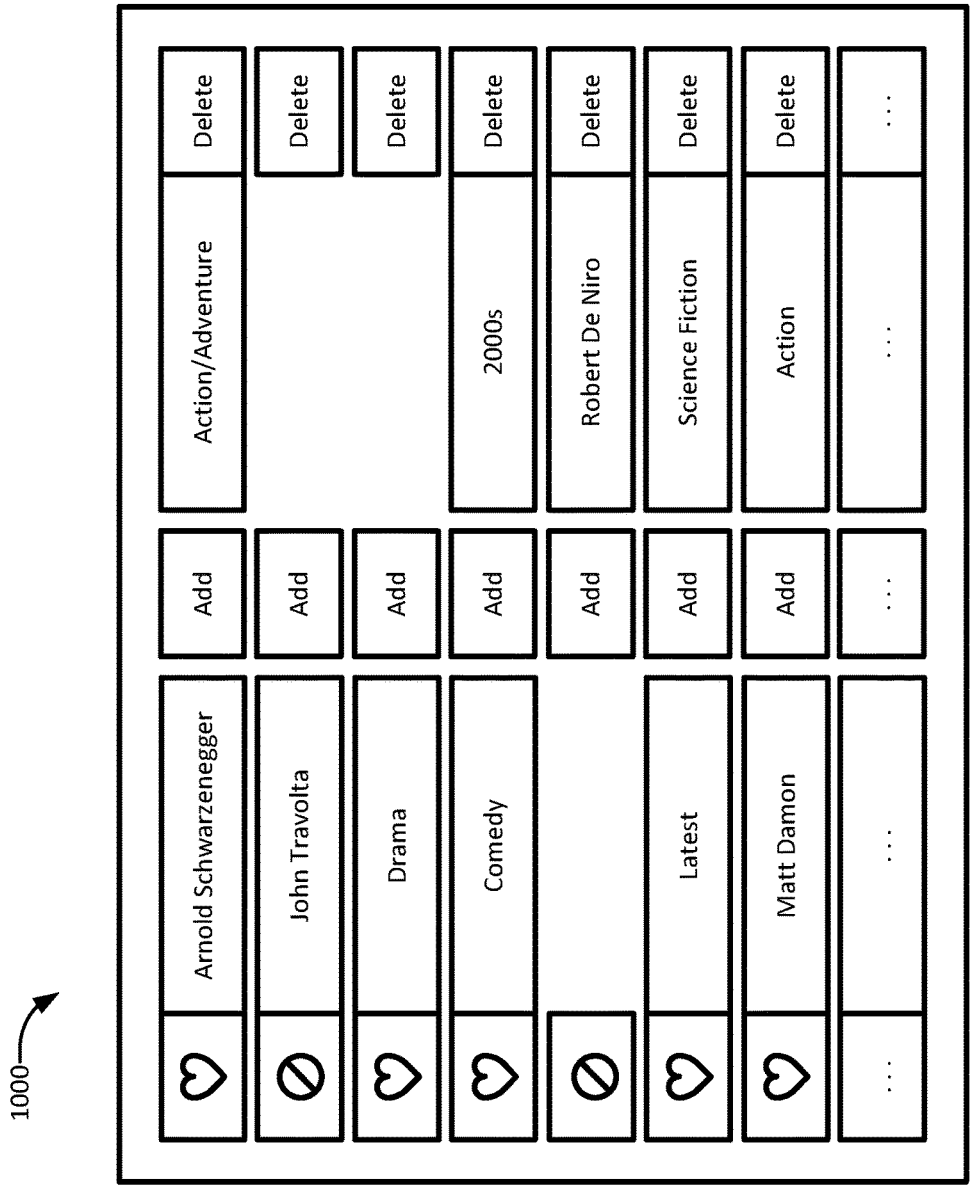
FIG. 10 is a diagram of an example user interface for providing feedback regarding user content preferences.

FIG. 10 is a diagram of an example user interface 1000 for providing feedback regarding user content preferences. As shown, user interface 1000 may include content features (e.g., Arnold Schwarzenegger, Action/Adventure, John Travolta, Drama, etc.), an indication (e.g., a heart or a crossed-out circle) of whether the content feature is preferred or not, an Add button to create a combination of content features (e.g., Arnold Schwarzenegger and Action/Adventure), and a Delete button to remove a content feature or combination of content features. In the user interface 1000, the top-to-bottom placement of the preferences may indicate an order of the preferences. For example since the Schwarzenegger/Action preference appears much above Matt Damon/Action, it means that the user's preference for Action/Adventure movies starring Arnold Schwarzenegger is greater than the user's preference for Action movies starring Matt Damon. Similarly, the left-to-right placement of the preferences may also indicate preference superiority. For instance, interface 1000 may indicate that the user has a greater preference for movies starring Arnold Schwarzenegger than Action/Adventure movies. The placement and thus the order of preferences can be modified by a drag-and-drop or other similar methods.

Content recommendations server 230 may provide user device 210 with the information in user interface 1000, which may be accompanied by one or more content recommendations from content recommendations server 230. Additionally, as described below, the user may provide feedback to content recommendations server 230 by modifying the information in user interface 1000.

User interface 1000 may indicate that the user prefers (as indicated by a heart symbol) content that includes the actor Arnold Schwarzenegger and the genre of Action/Adventure. If or when the user decides that he or she is no longer interested in content that includes the actor Arnold Schwarzenegger and the genre of Action/Adventure, the user could modify the corresponding entry by changing the heart symbol to a crossed-out circle symbol or by selecting the delete button. Deleting the entire entry may indicate that the user simply has no preference for content that includes the actor Arnold Schwarzenegger and the genre of Action/Adventure, whereas changing the heart symbol to a crossed-out circle may indicate an aversion to content that includes the actor Arnold Schwarzenegger and the genre of Action/Adventure.

User interface 1000 also may indicate that the user dislikes content that includes the actor John Travolta (as indicated by the crossed-out circle). As an example, upon viewing user interface 1000, the user may decide that he or she only dislikes content that includes the actor John Travolta during the 1970s. As such, the user could clarify this preference by selecting the corresponding Add button and specifying the content feature of 1970s (which may appear across from the entry for John Travolta and below the entry for Action/Adventure). Doing so may indicate to content recommendations server 230 that content that includes John Travolta is acceptable so long as the content was not made during the 1970s.

User interface 1000 also may indicate that the user enjoys content associated with the genre of Comedy and the 2000s (as indicated by the corresponding heart) so long as the content does not include the actor Robert De Niro (as indicated by the corresponding crossed-out circle). As an example, upon reviewing user interface 1000, the user may decide that he or she also doesn't like content associated with Comedy and the 2000s that are also associated with the actor Owen Wilson. As such, the user may modify user interface 1000 may selecting the Add button corresponding to the entry for Robert De Niro and create another entry for Owen Wilson. In response, user interface 1000 may create a new row of entries below the entry for Robert De Niro in order to maintain an accurate visual representation of the user's aversion to Comedies in the 2000s that include Robert De Niro or Owen Wilson.

User interface 1000 also indicates that the user has a preference for content associated with the genre of Drama, recently available content (e.g., Latest) associated with Science Fiction, and content associated with the actor Matt Damon and the genre of Action. Accordingly, user interface 1000 provides one example of providing a user with the reasons for which content has been recommended to the user and a medium for providing feedback to content recommendations server 230 regarding those reasons.

As such, techniques described herein may be used to create an implicit user profile based on, for example, previous viewing data and recommendation models (e.g., a single-tiered matrix, a multi-tiered matrix, a neural network, or an HMM). The implicit user profile may be converted into an explicit user profile as feedback, regarding content recommendations and the reasons for the content recommendations, is received from the user and applied to the implicit user profile in order to more accurately describe the preferences of the user. The explicit user profile may then be applied to the recommendation models in order to provide the user with more effective content recommendations.

In some implementations, one or more of the techniques described herein may be applied to search operations as well. In such a scenario, a search initiated by the user may effectively be a request for content recommendations based on parameters (e.g., search terms) provided by the user and the content recommendations (and reasons for the content recommendations) may be provided in a manner that is similar to the approaches described above. Additionally, in response to the content recommendations and the reasons for the content recommendations, the user may provide feedback that may be applied to a profile of the user in the manner described above.

In some implementations, content recommendations server 230 may be capable of modeling abstract preferences such as the user's appetite for serendipity, variety, predictability, and the user's change in preferences over time. In some implementations, the abstract parameters may be extrapolated from more concrete preferences. For example, based on the viewing history of the user, content recommendations server 230 may determine that the user enjoys watching different genres (as opposed to primarily enjoying only a few genres). In such a scenario, content recommendations server 230 may determine that the user has a preference for variety and may factor the user's preference for variety into making content recommendations. As such, a user profile may include preferences that are more concrete (e.g., director, cast, etc.) and preferences that are more abstract (e.g., the moving "raising philosophical issues," being "light hearted," etc.).

FIG. 11 is a diagram of example components of a device 1100. Each of the devices illustrated in FIGS. 1-2 may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 3, the order of the blocks may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a server device, the method comprising:
 determining, by the server device, recommendations for media content for a user based on user profile information and a viewing history of media content of the user, the recommendations being further based on features associated with each item of the media content, wherein each feature is associated with a category and, on a per-user basis:
a weight for the category,
a raw score for the feature, and
a weighted score that is based on the weight for the category and the score for the feature,
wherein the determining of the recommendations for the media content includes using a multi-tiered utility matrix for determining the recommendations for the media content;
communicating, by the server device and to a user device associated with the user,
the recommendations for the media content, and
one or more reasons for which the server device determined the recommendations, wherein the one or more reasons indicate a set of features, of the recommended media content, that were used in the determination of the recommendations,
wherein communicating the recommendations and the one or more reasons allows the user device to present at least one of the recommendations and at least one of the features, of the set of features that were used in the determination of the recommendations;
receiving, by the server device, feedback, from the user device, regarding:
the recommendations for the media content, and
the at least one feature, of the set of features used by the server device to determine the recommendations;
modifying, by the server device, the weighted score for the at least one feature, the modifying including at least one of:
modifying the weight for the category associated with the at least one feature, or
modifying the raw score for the at least one feature;
determining, by the server device, recommendations for different media content for the user based on:
the feedback regarding the recommendations for the media content, and
the modified weighted score, as determined based on the feedback regarding the at least one feature, of the set of features that were used by the server device to determine the recommendations,
wherein the determining of the recommendations for the different media content includes:
updating the multi-tiered utility matrix based on the feedback regarding the recommendations for the media content and the modified weighted score, as determined based on the feedback regarding the at least one feature, of the set of features, that were used to determine the recommendations, and
determining the recommendations for the different media content further based on the updated multi-tiered utility matrix; and
communicating, by the server device and to the user device, the recommendations for the different media content.

2. The method of claim 1, further comprising:
receiving, from the user device, a selection of media content corresponding to the recommendations for the different media content; and
providing the selected media content to the user device.

3. The method of claim 1, wherein the media content is first media content, wherein the different media content is second media content, the method further comprising:
determining recommendations for third media content using a single-tiered utility matrix for determining the recommendations for the third media content, and
determining recommendations for fourth media content, wherein the determining of the recommendations for the fourth media content includes:
updating the single-tiered utility matrix based on feedback regarding the recommendations for the third media content and feedback regarding one or more features that were used to determine the recommendations for the third media content, and
determining the recommendations for the fourth media content based on the updated single-tiered utility matrix.

4. The method of claim 1, wherein:
the determining of the recommendations for the media content further includes using a neural network for determining the recommendations for the media content, and
the determining of the recommendations for the different media content further includes:
updating the neural network based on the feedback regarding the recommendations for the media content and the modified weighted score, as determined based on the feedback regarding the at least one feature, of the set of features, that were used to determine the recommendations, and
determining the recommendations for the different media content further based on the updated neural network.

5. The method of claim 1, wherein:
the determining of the recommendations for the media content further includes using a Hidden Markov Model (HMM) for determining the recommendations for the media content, and
the determining of the recommendations for the different media content further includes:
updating the HMM based on the feedback regarding the recommendations for the media content and the modified weighted score, as determined based on the feedback regarding the at least one feature, of the set of features, that were used to determine the recommendations, and
determining the recommendations for the different media content further based on the updated HMM.

6. The method of claim 1, wherein:
the recommendations for the media content correspond to output nodes of a neural network used to determine the recommendations,
the reasons for the recommendations are obtained based on analysis of hidden nodes of the neural network,
the hidden nodes are updated based on the feedback from the user regarding the recommendations for the media content and the modified weighted score, as determined based on the feedback regarding the at least one feature, of the set of features, that were used to determine the recommendations, and
the recommendations for the different media content correspond to the output nodes of the neural network after the hidden nodes are updated.

7. The method of claim 1, wherein:
the recommendations for the media content are further based on a set of hidden preferences of a HMM used to determine the recommendations, wherein a particular hidden preference, of the set of hidden preferences, is associated with a same category as the one or more features,
the particular hidden preference is updated based on the feedback from the user regarding the recommendations for the media content and the modified weight for the category with which the particular hidden preference is associated, and
the recommendations for the different media content are based on the updated hidden preference in the HMM.

8. A server device comprising:

a non-transitory computer-readable medium containing program instructions; and one or more processors to execute the program instructions to:
- determine recommendations for media content for a user based on user profile information and a viewing history of media content of the user, the recommendations being further based on features associated with each item of the media content,
  - wherein each feature is associated with a category and, on a per-user basis:
    - a weight for the category,
    - a raw score for the feature, and
    - a weighted score that is based on the weight for the category and the score for the feature,
  - wherein the determining of the recommendations for the media content includes using a multi-tiered utility matrix for determining the recommendations for the media content;
- communicate, to a user device associated with the user, the recommendations for the media content, and
  - one or more reasons for which the server device determined the recommendations, wherein the one or more reasons indicate a set of features, of the recommended media content, that were used in the determination of the recommendations,
  - wherein communicating the recommendations and the one or more reasons allows the user device to present at least one of the recommendations and at least one of the features, of the set of features that were used in the determination of the recommendations;
- receive feedback, from the user device, regarding:
  - the recommendations for the media content, and
  - the at least one feature, of the set of features used by the server device to determine the recommendations;
- modify the weighted score for the at least one feature, the modifying including at least one of:
  - modifying the weight for the category associated with the at least one feature, or
  - modifying the raw score for the at least one feature;
- determine recommendations for different media content for the user based on:
  - the feedback regarding the recommendations for the media content, and
  - the modified weighted score, as determined based on the feedback regarding at least one feature, of the set of features that were used by the server device to determine the recommendations,
  - wherein executing the program instructions, to determine the recommendations for the different media content, further causes the one or more processors to:
    - update the multi-tiered utility matrix based on the feedback regarding the recommendations for the media content and the modified weighted score, as determined based on the feedback regarding the at least one feature, of the set of features, that were used to determine the recommendations, and
    - determine the recommendations for the different media content further based on the updated multi-tiered utility matrix; and
- communicate, to the user device, the recommendations for the different media content.

9. The server device of claim 8, wherein executing the program instructions further causes the one or more processors to:
- receive, from the user device, a selection of media content corresponding to the recommendations for the different media content; and
- provide the selected media content to the user device.

10. The server device of claim 8, wherein the media content is first media content, wherein the different media content is second media content, wherein executing the program instructions, to determine the recommendations for the media content, further causes the one or more processors to:
- use a single-tiered utility matrix to determine recommendations for third media content, and
- determine recommendations for fourth media content, wherein executing the program instructions, to determine the recommendations for the fourth media content, causes the one or more processors to:
  - update the single-tiered utility matrix based on feedback regarding the recommendations for the third media content and feedback regarding one or more features that were used to determine the recommendations, and
- determine the recommendations for the fourth media content based on the updated single-tiered utility matrix.

11. The server device of claim 8, wherein:
- executing the program instructions, to determine the recommendations for the media content, further causes the one or more processors to use a neural network to determine the recommendations for the media content, and
- executing the program instructions, to determine the recommendations for the different media content, further causes the one or more processors to:
  - update the neural network based on the feedback regarding the recommendations for the media content and the modified weighted score, as determined based on the feedback regarding the at least one feature, of the set of features, that were used to determine the recommendations, and
  - determine the recommendations for the different media content based on the updated neural network.

12. The server device of claim 8, wherein:
- executing the program instructions, to determine the recommendations for the media content, further causes the one or more processors to use a Hidden Markov Model (HMM) to determine the recommendations for the media content, and
- executing the program instructions, to determine the recommendations for the different media content, further causes the one or more processors to:
  - update the HMM based on the feedback regarding the recommendations for the media content and the modified weighted score, as determined based on the feedback regarding the at least one feature, of the set of features, that were used to determine the recommendations, and
  - determine the recommendations for the different media content based on the updated HMM.

13. The server of claim 8, wherein:
the recommendations for the media content correspond to output nodes of a neural network used to determine the recommendations,
the reasons for the recommendations correspond to hidden nodes of the neural network,
the hidden nodes are updated based on the feedback from the user regarding the recommendations for the media content and the modified weighted score, as determined based on the feedback regarding the at least one feature, of the set of features, that were used to determine the recommendations, and
the recommendations for the different media content correspond to the output nodes of the neural network after the hidden nodes are updated.

14. The server of claim 8, wherein:
the recommendations for the media content are based on hidden preferences of a HMM used to determine the recommendations,
the reasons for the recommendations include the hidden preferences,
the hidden preferences are updated based on the feedback from the user regarding the recommendations for the media content and the modified weighted score, as determined based on the feedback regarding the at least one feature, of the set of features, that were used to determine the recommendations, and
the recommendations for the different media content are based on the updated hidden preferences in the HMM.

15. A server device comprising:
a non-transitory memory device storing a plurality of processor-executable instructions; and
a processor configured to execute the processor-executable instructions, wherein executing the processor-executable instructions causes the processor to:
  receive a request, from a user device, for recommendations of media content for a user,
  use a multi-tiered utility matrix to identify the recommendations for media content based on:
    user profile information and a viewing history of the user,
    features associated with the media content, wherein each feature is associated with a category and, on a per-user basis:
      a category,
      a weight for the category,
      a raw score for the feature, and
      a weighted score that is based on the weight for the category and the score for the feature,
  provide, to the user device, the recommendations for media content,
  provide, to the user device, one or more reasons for which the server device identified the media content as recommended for the user, wherein the one or more reasons indicate a set of features, of the recommended media content, that were used in the identification of the recommendations,
    wherein providing the recommendations and the one or more reasons allows the user device to present at least one of the recommendations and at least one of the features, of the set of features that were used in the identification of the recommendations,
  receive feedback information, from the user device, regarding the at least one feature, of the set of features used by the server device to identify the media content as recommended,
  modify the weighted score for the at least one feature, the modifying including at least one of:
    modifying the weight for the category associated with the at least one feature, or
    modifying the raw score for the at least one feature,
  update the multi-tiered utility matrix based on the feedback regarding the at least one feature for the media content and the modified weighted score, as determined based on the feedback regarding the at least one feature, of the set of features, that were used to determine the recommendations,
  identify new recommendations for media content based on the modified weighted score and the updated multi-tiered utility matrix, and
  provide the user with the new recommendations for the media content.

16. The server device of claim 15, wherein executing the processor-executable instructions causes the processor to:
receive, from the user device, a selection of media content corresponding to the new recommendations for the media content; and
provide the selected media content to the user device.

17. The server device of claim 15, wherein:
the recommendations for the media content correspond to output nodes of a neural network used to determine the recommendations,
the reasons for which the media content is recommended correspond to hidden nodes of the neural network,
the hidden nodes are updated based on the modified weighted score, and
the new recommendations for the media content correspond to the output nodes of the neural network after the hidden nodes are updated.

18. The server device of claim 15, wherein:
the recommendations for the media content are further based on a set of hidden preferences of a HMM used to determine the recommendations, wherein a particular hidden preference, of the set of hidden preferences, is associated with a same category as the one or more features,
the particular hidden preference is updated based on the modified weight for the category with which the particular hidden preference is associated, and
the new recommendations for the media content are based on the updated hidden preference in the HMM.

19. The server device of claim 15, wherein:
executing the processor-executable instructions, to identify the recommendations for the media content, further causes the processor to use a Hidden Markov Model (HMM) to identify the recommendations for the media content, and
executing the processor-executable instructions, to identify the new recommendations for media content, further causes the one or more processors to:
  update the HMM based on the feedback regarding the recommendations for the media content and the modified weighted score, as determined based on the feedback regarding the at least one feature, of the set of features, that were used to determine the recommendations, and
  identify the new recommendations for media content based on the updated HMM.

20. The server device of claim 15, wherein:
executing the processor-executable instructions, to identify the recommendations for the media content, further causes the processor to use a neural network to determine the recommendations for the media content, and executing the processor-executable instructions, to identify the new recommendations for the different media content, further causes the processor to:
update the neural network based on the feedback regarding the recommendations for the media content and the modified weighted score, as determined based on the feedback regarding the at least one feature, of the set of features, that were used to identify the recommendations, and
identify the new recommendations for media content based on the updated neural network.

\* \* \* \* \*